(No Model.)
G. T. PARRY.
MINER'S SAFETY LAMP.
No. 467,193. Patented Jan. 19, 1892.
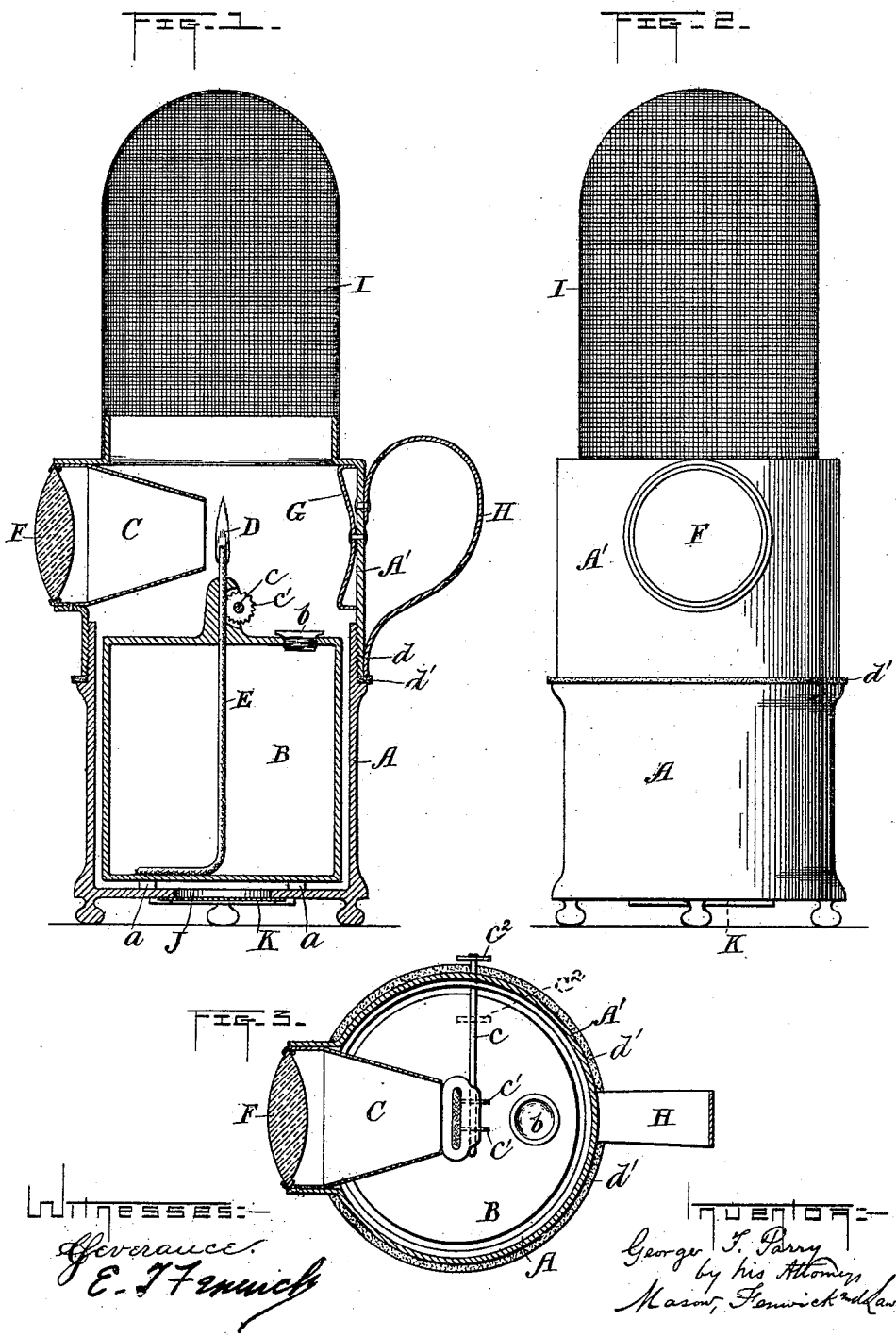

UNITED STATES PATENT OFFICE.

GEORGE T. PARRY, OF PHILADELPHIA, PENNSYLVANIA.

MINER'S SAFETY-LAMP.

SPECIFICATION forming part of Letters Patent No. 467,193, dated January 19, 1892.

Application filed February 24, 1891. Serial No. 382,486. (No model.)

*To all whom it may concern:*

Be it known that I, GEORGE T. PARRY, a citizen of the United States, residing at Philadelphia, in the State of Pennsylvania, have invented certain new and useful Improvements in Miners' Safety-Lamps; and I do hereby declare the following to be full, clear, and exact description of the invention, such as will enable others skilled in the art to which it appertains to make and use the same.

My invention relates to an improvement in safety-lamps for miners' use; and it consists in a novel construction of this type of lamp whereby, while all of its qualities as a safety-lamp are maintained and it affords a strong and brilliant light through a bull's-eye in its side, it is rendered more efficient and convenient of manipulation, as well as very compact, as will be hereinafter described.

In the accompanying drawings, Figure 2 is a front view of my improved lamp; Fig. 1, a vertical central section of the same, and Fig. 3 a horizontal section through the center of the bull's-eye and the body of the lamp.

A in the drawings is a metal case provided on its bottom plate with a series of supports $a$, on which rests an ordinary lamp B, around which air can pass to the flame, and the same being provided with a filling-hole $b$ and a ratchet-wheel shaft $c$, with ratchets $c'$ to raise or lower the wick. The shaft $c$ may be adjusted from the outside by a button $c^2$ on its end or on the inside of the lamp-case by a button $c^2$, located as indicated by dotted lines.

To the case-section A an upper metal-case section A' is screwed fast at $d$, as shown, making with an india-rubber washer $d'$ an air-tight joint or connection.

C represents an outwardly-flared conical tube arranged in the front part of the section A' of the metal case and firmly secured therein in any suitable manner. The truncated small end of this tube extends nearly to the flame D of the wick E and serves for concentrating the light from flame D.

In the front cylindrical end of the tube C, just forward of the largest diameter of the conical portion of said tube, a bull's-eye F is placed, as shown. By means of the tube C the concentrated light is, in a diffused condition, thrown upon the bull's-eye in such a manner as to secure a more brilliant illumination in the mine, a result that would not be accomplished without this tube in so perfect and effective a manner. Behind the flame D a reflector G may be arranged, the same being fastened to the portion A' of the metal case.

Outside of the section A', at the rear of the lamp, a loop-handle H is provided. The upper part of the lamp above the case-section A' is, as usual, formed of wire-gauze I, which is fastened by its lower edge to the upper edge of the section A', as shown. In the bottom of the section A a draft-opening J is provided, and this opening is covered with wire-gauze K of about the same mesh as the wire-gauze I. Under this construction in order to fill the lamp at the opening $b$ the sections A' A² are separated by unscrewing the same at $d$.

From the foregoing description it will be seen that all parts of the case containing the lamp are air-tight, excepting the wire-gauze I and the draft-opening J, covered by the wire-gauze K. It will also be seen that the flame D from the lamp B will light up the safety covering-gauze I the same as in the ordinary Davy lamp, while the reflection of light from the bull's-eye F will be a bright and steady light for aiding workmen in their operations in the mine, and at the same time my improved lamp possesses all the security of the said Davy lamp.

It will be further seen that the outer case of my lamp is constructed to form a chamber in which a reservoir-lamp is placed, and that the reservoir-lamp is a distinct structure from said case, and when placed within the case it is surrounded on all sides and at bottom by a large air-space, through which air circulates for promoting combustion at the wick, such air being admitted through a wire gauze-covered opening in the bottom section of the case.

What I claim as my invention is—

1. The combination of the wire-gauze I, metal sections A A' of the lamp-case, one having a draft-opening in its bottom section A, a reservoir-lamp B, of less diameter than the said bottom section of the case and arranged within the same so as to be surrounded by an air-space at bottom and side, and the light-concentrating tube C, provided with a bull's-eye at its forward end, substantially as described.

2. A miner's safety-lamp comprising a lamp B, a lower section of case A, having a draft-passage closed by wire-gauze in its bottom section, an upper section of metal case A', detachably connected to the section A, a wire-gauze top portion I, and a bull's-eye F, substantially as described.

3. The combination of the section A, lamp B, constructed separately from the section A of the case and arranged within said section of the case, with an air-space around and beneath it, through which air supplied through an opening in the said bottom section of the case passes up to the burning-wick section A', reflector G, tube C, having a bull's-eye, and wire-gauze top portion I, substantially as described.

In testimony whereof I hereunto affix my signature in presence of two witnesses.

GEORGE T. PARRY.

Witnesses:
  E. T. FENWICK,
  C. SEVERANCE.